United States Patent [19]
Fourie et al.

[11] Patent Number: 5,590,556
[45] Date of Patent: Jan. 7, 1997

[54] APPARATUS FOR THE MANUFACTURE OF A THIN METALLIC STRIP

[76] Inventors: Eugene Fourie, 57 Herbert Baker Drive, Groenkloof, Pretoria; Mechiel N. Nieuwoudt, 246 Rosalind Avenue, Murrayfield, Pretoria; Johannes H. Fehrsen, 20A Meyer Street, Oaklands, Johannesburg, all of South Africa

[21] Appl. No.: 189,704

[22] Filed: Feb. 1, 1994

[30] Foreign Application Priority Data

Feb. 11, 1993 [ZA] South Africa .............................. 93/0952

[51] Int. Cl.⁶ .................................................. B21B 31/02
[52] U.S. Cl. ............................................................ 72/237
[58] Field of Search .......................... 72/8–12, 16, 200, 72/202, 203, 240, 237, 248, 249; 83/73, 287, 407, 425.4, 433; 432/8, 45

[56] References Cited

U.S. PATENT DOCUMENTS

| | | | |
|---|---|---|---|
| 1,590,854 | 6/1926 | Rothera et al. | 72/237 |
| 2,653,247 | 9/1953 | Lundahl | 72/16 |
| 3,728,924 | 4/1973 | Wutke | 83/426 |
| 4,215,558 | 8/1980 | Shiguma et al. | 72/240 |
| 4,248,072 | 2/1981 | Hasegawa et al. | 72/11 |
| 4,265,152 | 5/1981 | Corradi | 83/106 |
| 4,785,653 | 11/1988 | Danielsson | 72/237 |
| 4,836,774 | 6/1989 | Harada et al. | 432/8 |
| 4,959,099 | 9/1990 | Wilson | 72/240 |

*Primary Examiner*—Lowell A. Larson
*Assistant Examiner*—Thomas C. Schoeffler
*Attorney, Agent, or Firm*—Cushman Darby & Cushman IP Group of Pillsbury Madison & Sutro, LLP

[57] ABSTRACT

An apparatus for manufacturing a metallic strip having a varying thickness which includes a supply means for providing a supply of elongate metallic feedstock, a pair of opposed forming rollers for working the feedstock in a cold condition, and a separation varying means for varying the separation of the forming rollers during operation thereby to vary the thickness of the feedstock and provide formed strip with a varying thickness.

9 Claims, 2 Drawing Sheets

APPARATUS FOR THE MANUFACTURE OF A THIN METALLIC STRIP

This invention relates to the manufacture of a metallic strip. More particularly, it relates to a method and apparatus for manufacturing a metallic strip having a varying thickness. Further, the metallic strip may particularly be utilized as part of a windscreen wiper blade assembly.

According to a first aspect of the invention, there is provided a method of manufacturing a metallic strip having a varying thickness, which includes providing a supply of elongate metallic feedstock;

passing the feedstock in a cold condition through a pair of opposed forming rollers; and varying the separation of the forming rollers during operation thereby to vary the thickness of the feedstock and provide formed strip with a varying thickness.

The feedstock may be strip-like and may have a substantially constant thickness and width.

The method may include the steps of measuring the thickness of formed strip issuing from the forming rollers and controlling the separation of the rollers in a feedback manner, in response to the measured thickness.

It will be appreciated by those skilled in the art that the term "cold condition" will refer to a temperature which will vary from metal to metal. Thus, for example, if the feedstock is steel, it may be supplied to the rollers at a temperature of below 900° C. Preferably, steel feedstock may be supplied at a temperature of between 20° C. and 100° C.

The rotational axis of one of the rollers may be kept fixed while the position of the rotational axis of the other forming roller relative thereto may be varied in order to vary a gap between the two forming rollers. Instead, the position of both rotational axes may be varied.

In the event that the rotational axis of one forming roller is kept fixed and the rotational axis of the other forming roller is displaced back and forth, the moving axis may be displaced substantially perpendicularly to the direction of travel of the strip through and between the forming rollers. If both rotational axes are displaced, they may both be displaced substantially perpendicularly to the direction of travel of the strip.

The rotational axes may be kept parallel to one another or they may be tilted with respect to one another. They are preferably kept parallel to one another.

The thickness of the formed strip may be varied in a single pass between the forming rollers.

The feedstock may be worked so that the thickness of the formed strip varies in a ratio of at least 2:1. Preferably, the feedstock is worked so that the thickness of the formed strip varies in a ratio of at least 3:1.

The thickness may be varied in a cyclical manner along the length of the strip.

The rotational speeds of the forming rollers may be substantially the same. It will be appreciated that, because the thickness of the strip is varied, the speed at which the strip exits from the forming rollers will be different from the speed at which it enters the forming rollers. This may be accommodated by varying the rotational speed of the forming rollers so as to obtain a substantially constant output speed.

The speeds of the forming rollers may also be varied with respect to each other to impart a curvature along the formed strip.

The method may include cutting the formed strip longitudinally to vary the width thereof. The width of the longitudinally cut strip may be measured and the width of the cut varied in a feedback manner as a result of the measurement obtained.

The formed strip may be cut transversely into lengths with each length having the same variation in thickness and width along its length.

Further according to the first aspect of the invention, there is provided an apparatus for manufacturing a metallic strip having a varying thickness which includes a supply means for providing a supply of elongate metallic feedstock;

a pair of opposed forming rollers for working the feedstock in a cold condition; and a separation varying means for varying the separation of the forming rollers during operation thereby to vary the thickness of the feedstock and provide formed strip with a varying thickness.

A rotational axis of one of the forming rollers may be fixed while the position of a rotational axis of the other roller relative thereto may be variable so that a gap between the two forming rollers is varied, in use.

The apparatus may include a suitable drive means for driving each forming roller independently.

The apparatus may further include a measuring means for measuring the thickness of formed strip issuing from the forming rollers and a feedback control means for controlling the separation of the rollers in a feedback manner, in response to the measuring means.

A longitudinal cutting means may be provided for cutting the strip longitudinally so that the width of the formed strip varies. A measuring means may be provided to measure the width of the strip and a feedback control means may be operably connected to the measuring means to control the operation of the longitudinal cutting means in a feedback manner.

The apparatus may include a transverse cutting means for cutting the formed strip into lengths with each length having the same variation in thickness and width along its length.

According to a second aspect of the invention, there is provided a method of heat treating a metallic strip having a varying thickness, which includes providing a metallic strip with varying thickness;

displacing the strip in a continuous manner through a heating station; and adjusting the energy supplied by the heating station in accordance with the thickness of the strip passing therethrough.

The method may include measuring the thickness of the metallic strip and adjusting the energy supplied by the heating station, in response to the measured thickness.

Further according to the second aspect of the invention, there is provided an apparatus for heat treating a metallic strip having a varying thickness which includes a heating station for heating the strip;

a feed means for feeding the strip through the heating station in a continuous manner; and an adjustment means for adjusting the energy supplied by the heating station in accordance with the thickness of the strip passing therethrough.

The apparatus may include a measuring means for measuring the thickness of the metallic strip and a control means for controlling the adjustment means, in response to the measured thickness.

According to a third aspect of the invention, there is provided a forming roller arrangement which includes a first forming roller which is rotatable about a first rotational axis and has a first and second end;

a first bearing means for rotatably supporting the first roller, the first bearing means being located between the first and second ends of the first roller to provide an exposed end portion of the first roller at its first end;

a second forming roller having a first and second end which is rotatable about a second rotational axis;

a second bearing means for rotatably supporting the second roller, the second bearing means being located between the first and second ends of the second roller to provide an exposed end portion of the second roller at its first end; and with the rollers extending in opposite directions with their exposed end portions overlapping one another and being spaced apart to define a rolling region between them.

The first roller may be mounted in a first carrier and the second roller may be mounted in a second carrier, with the end portions of the rollers projecting from their carriers and overlapping one another.

The first roller and the second roller may each have a drive means connected to its second end for rotatably driving it.

The first and second carriers may be displaceable with respect to one another, thereby to vary the separation of the rollers at their end portions.

The arrangement may include a support means for supporting the carriers in a displaceable manner. The support means may include a plurality of slide columns with one of the carriers being fixed to the columns and the other being slidable therealong.

Each carrier may have a carrier portion in which its respective roller is mounted, and a support portion which extends beyond the first end of its respective roller. The first and second carriers may be arranged in a complementary manner, such that the carrier portion of the first carrier is aligned with the support portion of the second carrier and vice versa.

Two columns may pass through the carrier portion of the first carrier and may be fixed to the support portion of the second carrier and two columns may pass through the support portion of the first carrier and may be fixed to the carrier portion of the second carrier.

The arrangement may include a displacing means for displacing one of the carriers with respect to the other.

The arrangement may further include a base, the columns being secured to the base. The first carrier may be located between the second carrier and the base, with the second carrier being fixed on the columns relative to the base and with the first carrier being displaceable between them. The displacing means may be located between the base and the first carrier.

Those skilled in the art will appreciate that the rollers are rotatably supported in their carriers in a cantilever manner.

The invention is now described, by way of examples, with reference to the accompanying drawings in which.

Figure 1:
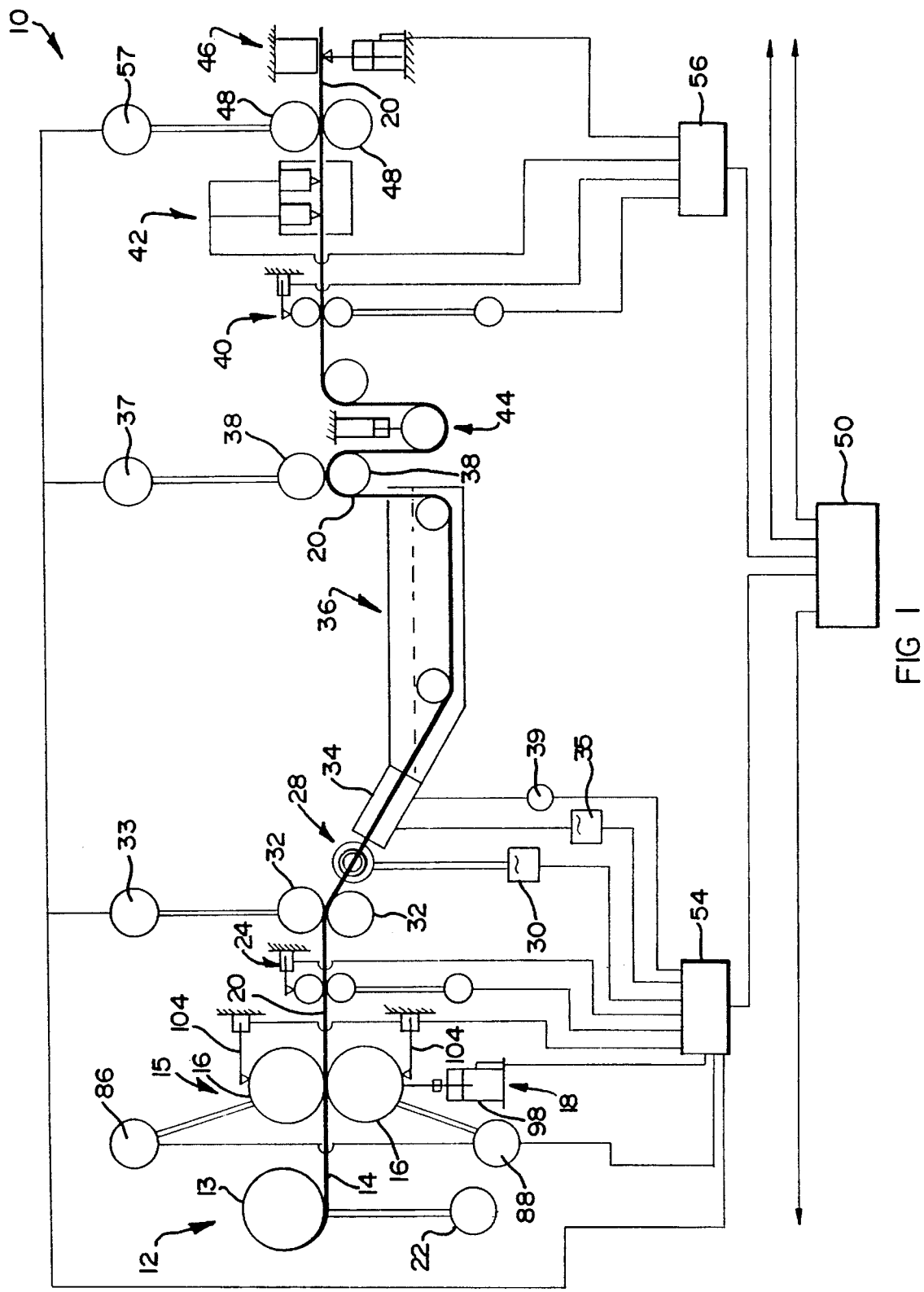
FIG. 1 shows a schematic diagram of an apparatus, in accordance with the invention, for manufacturing a metallic strip with a varying thickness.

In FIG. 1 reference numeral 10 generally indicates an apparatus for manufacturing a metallic strip with a varying thickness in accordance with the invention.

The apparatus 10 includes a supply means 12 for providing a supply of elongate mild steel feedstock 14 which has a constant thickness and width and is strip-like. The feedstock 14 has a width of 13 mm and a thickness of 1.4 mm. The supply means 12 includes a rotatable coil 13 of the feedstock 14. The coil 13 is operatively connected to an input speed varying means 22. A rolling mill assembly 15 including a pair of opposed forming rollers 16 is provided for working the feedstock 14 in a cold condition. A separation varying means 18 is also provided for varying the separation of the forming rollers 16, during operation, thereby to provide formed strip 20 with a varying thickness. The thickness of the strip 20 varies between 1.29 mm and 0.30 mm. The rollers are smooth and circular cylindrical in their operative regions.

The input speed varying means 22 varies the rate at which the feedstock 14 is supplied to the forming rollers 16 to control the tension in the feedstock 14, in use.

The apparatus 10 further includes a measuring means 24 for measuring the thickness of the formed strip 20 exiting from the forming rollers 16. The measuring means 24 is connected to a control means 54. The control means 54 controls the separation of the rollers 16 in a feedback manner, in response to signals received from the measuring means 24. For this purpose a pair of sensors 104 measures the distance between the rollers 16. The separation varying means 18 is in the form of a hydraulic cylinder and piston rod arrangement. A piston rod 98 of the arrangement forming part of the separation varying means 18, is connected to the lower roller 16 to apply force via the rollers 16 on the feedstock 14. The piston rod 98 is connected to, and is responsive to, signals received from the control means 54.

A heating station 28 is provided for heating the strip 20 in a continuous manner once the strip 20 has emerged from the measuring means 24. Hence, a variable power supply 30 is provided for supplying power to the heating station 28 in accordance with the thickness of the strip 20 passing therethrough. The heating station 28 is in the form of an induction heater. Thus, the energy supplied by the power supply 30, in use, to the induction heater 28 is varied by varying the frequency of the signal output from the power supply 30. The power supply 30 is connected to the control means 54 to be responsive to signals emanating therefrom.

A pair of pull rollers 32 is arranged between the measuring means 24 and the heating station 28. The strip 20 is pulled through the rollers 32. Rotation of the rollers 32 is controlled by a motor 33, the motor 33 also being connected to the control means 54.

A heat soak 34 is provided in combination with a quenching station 36 which heat treats the strip 20. As with the power supply 30, the heat soak 34 is also connected to the control means 54 to be responsive to signals emanating therefrom. The power supplied to the heat soak 34 varies and is controlled by a power adjustment device 35 and a temperature controller 39.

A further pair of pull rollers 38 is provided for drawing the strip 20 from the tempering station 36 to a strip tensioning device 44. The strip tensioning device 44 maintains the tension in the strip 20. Once again, rotation of the rollers 38 is controlled by a motor 37, the motor 37 being connected to the control means 54.

A further measuring means 40 is provided to measure the thickness of the strip 20 after it has emerged from the tensioning device 39. A laser operable width cutting means 42 is arranged downstream of the measuring means 40 to cut the strip 20 longitudinally to obtain the desired width profile of the strip 20. The measuring means 40 is connected to the width cutting means 42 via a width cutting and length cutting control means 56 which controls the width to which the strip 20 is cut.

A length cutting unit 46 is provided downstream of the laser cutting means 42 to cut the strip 20 into desired lengths. Yet a further pair of pull rollers 48 is provided between the laser cutting means 42 and the cutting unit 46. The cutting unit 46 is also connected to the control means 56. Rotation of the further pair of rollers 48 is controlled by a motor 57, the motor 57 being connected to the control means 54.

A system control means 50 is provided to control the operation of the apparatus 10. The system control means 50 is connected to the control means 54 and the width cutting and length cutting control means 56.

In use, the feedstock 14 is decoiled from the coil 13 and is drawn towards the rolling mill assembly 15. The tension within the feedstock 14 is controlled by the control means 54. The forming rollers 16 "cold work" the feedstock 14 to vary the thickness of the feedstock 14 in a predetermined manner, and provide the formed strip 20. The strip 20 passes through the measuring means 24 which measures the thickness of the strip 20. By means of the control means 54, the piston rod 98 is utilised to vary continuously and cyclically the distance between the rollers 16 and thereby to control the thickness of the strip 20. The feedstock 14 is supplied to the rollers at a temperature of less than 900° C., and preferably at about 25° C.

Hereafter, the strip 20 passes into the pair of pull rollers 32 which direct the strip 20 into the induction heater 28. The speed of the pull rollers 32 is controlled by the control means 54. The induction heater is energised by means of the variable power supply 30 in dependence of the thickness of the strip 20. This process is governed by the control means 54 which receives signals from the measuring means 24 and transmits suitable signals to the power supply 30.

The strip 20 then enters the heat soak 34 and thereafter, the quenching station 36. The induction heater 28, the heat soak 34 and the tempering station 36 together serve to heat treat the strip 20. The operation of the heat soak 34 is also governed by the control means 54.

The pull rollers 38 draw the strip 20 from the quenching station 36 to the further measuring means 40 via the tensioning device 44 which maintains the required tension in the strip 20. The speed of the pull rollers 38 is governed by the control means 54 and by the motor 37.

Hereafter, the strip 20 passes through the further measuring means 40 which feeds data to the laser cutting means 42 via the width cutting and length cutting control means 56 in order that the strip 20 may be cut to the required width which varies in a predetermined manner. The pull rollers 48 feed the strip 20 at a speed governed by the control means 54 from the laser cutting means 42 to the length cutting unit 46 which is also controlled by the width cutting and length cutting control means 56 to cut the strip 20 into the required lengths of 450 mm each. Each length has the same thickness and width profile and is intended to be a support beam for a windscreen wiper. It will thus be appreciated that the thickness and width of the strip 20 varies in a cyclical manner along its length.

The dimensions of each length are as follows:

length=450 mm thickness at the center of each length=1.29 mm thickness at the ends of each length=0.30 mm width at the center=11 mm; and width at the ends=6 mm Each length tapers uniformly and continuously in both thickness and width in a straight line manner from its center to its ends.

Figure 2:
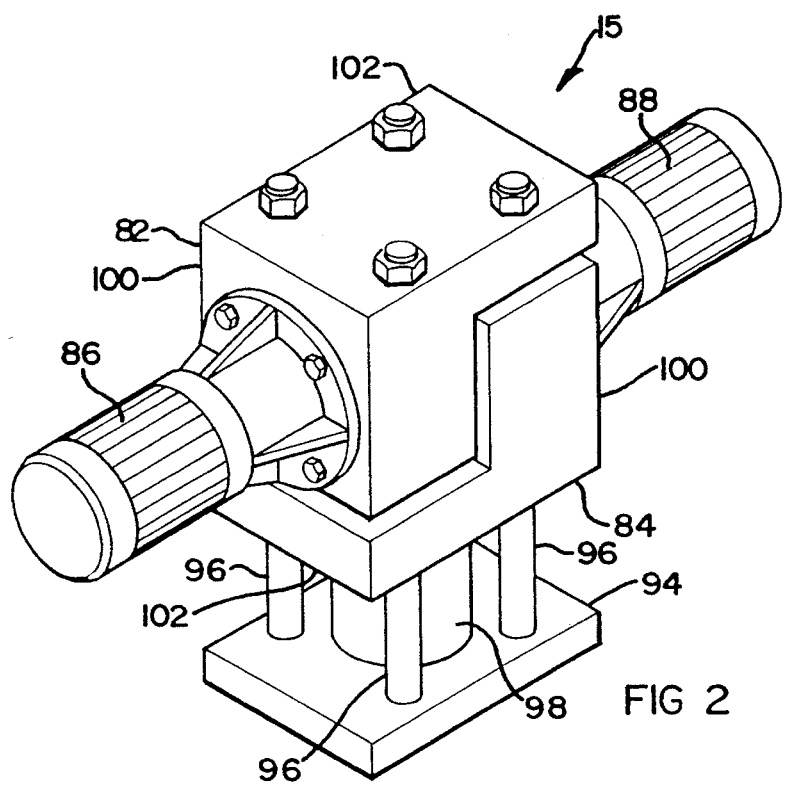
FIG. 2 shows a three-dimensional view of a rolling mill assembly for use in the apparatus.
Figure 3:
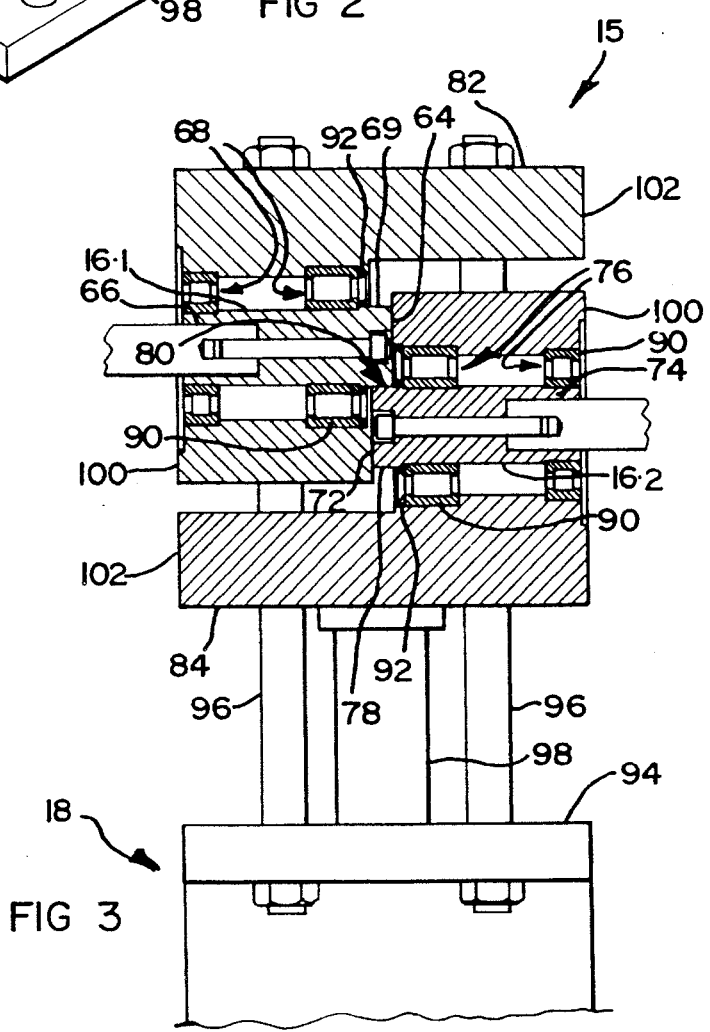
FIG. 3 shows a part-sectional front view of the rolling mill assembly.

Referring now to FIGS. 2 and 3 of the drawings, the rolling mill assembly 15 is shown.

The rolling mill assembly 15 includes a first forming roller 16.1 which is rotatable about a first rotational axis and has a first end 64 and a second end 66. A pair of cylindrical roller bearings 68 rotatably support the first roller 16.1. The bearings 68 are located between the first and second ends 64, 66 of the roller 16.1 to provide an exposed end portion 69 of the first roller 16.1 at its first end 64.

A second forming roller 16.2 is provided having a first end 72 and a second end 74, the roller 16.2 being rotatable about a second rotational axis. A pair of cylindrical roller bearings 76 rotatably supports the second roller 16.2. The bearings 76 are located between the first and second ends 72, 74 of the second roller 16.2 to provide an exposed end portion 78 of the second roller 16.2 at its first end 72. The rollers 16.1, 16.2 extend in opposite directions with their exposed end portions 69, 78 overlapping and being spaced apart to define a rolling region 80 between them. The end portions 69, 78 are smooth and circular cylindrical.

The first roller 16.1 is rotatably mounted, via the bearings 68, in a first carrier 82 and the second roller 16.2 is rotatably mounted, via the bearings 76, in a second carrier 84. The end portions 69, 78 of the rollers 16.1, 16.2 project from their carriers 82, 84 respectively and overlap one another.

The first roller 16.1 is driven by a drive means in the form of an electric motor 86. The motor 86 is connected to the first roller 16.1 at its second end 66. The second roller 16.2 has a similar electric motor 88 connected to its second end 74.

Axial shaft seals 92 are provided to minimize damage to the roller bearings 68 and 76 by the ingress of dirt.

The first and second carriers 82, 84 are displaceable with respect to one another, thereby to vary the separation of the rollers 62, 70 at their end portions 69, 78, thereby varying the gap between them.

A support base 94 is provided on which the first carrier 82 is mounted. The first carrier 82 is fixedly mounted on the support base 94 by means of four slide columns 96 to which the first carrier 82 is fixed. The second carrier 84 is slidably mounted on the slide columns 96 and the piston rod 98 is fixed to the second carrier 84 to permit the second carrier 84 to be hydraulically displaced with respect to the first carrier 82.

Each carrier 82, 84 has a carrier portion 100 in which its respective roller 16.1, 16.2 is mounted, and a support portion 102 which extends beyond the first end 64, 72 of its respective roller 16.1, 16.2. In each carrier 82, 84 two of the slide columns 96 pass through the carrier portion 100 and the other two columns 96 pass through the support portion 102.

The first and second carriers 82, 84 are arranged in a complementary manner, such that the carrier portion 100 of the first carrier 82 is aligned with the support portion 102 of the second carrier 84 and vice versa.

The applicant believes that this invention provides an effective method and apparatus for the production of heat treated metal strip. Further, the applicant believes that the metal strip produced as a result of the application of this invention will have particular, but not necessarily exclusive, application as part of a windscreen wiper blade assembly for automotive and other applications.

We claim:

1. A forming roller arrangement which includes:

a first forming roller which is rotatable about a first rotational axis and has first and second ends;

a first bearing means for rotatably supporting the first roller, the first bearing means being located between the first and second ends of the first roller to provide an exposed end portion of the first roller at its first end;

a second forming roller having first and second ends which is rotatable about a second rotational axis;

a second bearing means for rotatably supporting the second roller, the second bearing means being located between the first and second ends of the second roller to provide an exposed end portion of the second roller at its first end;

with the rollers extending in opposite directions with their exposed end portions overlapping one another and being spaced apart to define a rolling region between them;

a first carrier in which the first bearing means is housed with the end portion of the first roller projecting therefrom;

a second carrier in which the second bearing means is housed with the end portion of the second roller projecting therefrom;

a support means for supporting the carriers in a relatively displaceable manner thereby to vary the spacing between the end portions, comprising a plurality of slide columns with one of the carriers being fixed to the columns and the other being slidable therealong.

2. The arrangement as claimed in claim 1, in which the first roller and the second roller each has a drive means connected to its second end for rotatably driving it.

3. The arrangement as claimed in claim 1, in which each carrier has a carrier portion in which its respective roller is mounted, and a support portion which extends beyond the first end of its respective roller.

4. The arrangement as claimed in claim 3 in which the first and second carriers are arranged in a complementary manner, such that the carrier portion of the first carrier is aligned with the support portion of the second carrier and vice versa.

5. The arrangement as claimed in claim 4 in which two columns pass through the carrier portion of the first carrier and are fixed to the support portion of the second carrier and two columns pass through the support portion of the first carrier and are fixed to the carrier portion of the second carrier.

6. The arrangement as claimed in claim 1, which includes a displacing means for displacing one of the carriers with respect to the other.

7. The arrangement as claimed in claim 1, which includes a base, the columns being secured to the base.

8. The arrangement as claimed in claim 7, in which the first carrier is located between the second carrier and the base, with the second carrier being fixed on the columns relative to the base and with the first carrier being displaceable between them.

9. The arrangement as claimed in claim 8, which includes a displacing means located between the base and the first carrier for displacing the first carrier towards and away from the second carrier.

* * * * *